United States Patent
Hoke et al.

(10) Patent No.: US 6,686,984 B1
(45) Date of Patent: Feb. 3, 2004

(54) POLARIZATION CONTROL DEVICE

(75) Inventors: Charles Hoke, Palo Alto, CA (US); Gongjian Hu, San Jose, CA (US); Peter Robrish, San Francisco, CA (US); Andreas Weber, Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/502,362

(22) Filed: Feb. 29, 2000

(51) Int. Cl.[7] ............................................. G02F 1/1337
(52) U.S. Cl. ..................................... 349/130; 385/143
(58) Field of Search ........................... 349/130, 33, 36, 349/37; 345/87, 96, 98; 385/142, 143

(56) References Cited

U.S. PATENT DOCUMENTS

| | | | | |
|---|---|---|---|---|
| 4,779,959 A | * | 10/1988 | Saunders | 349/198 |
| 5,005,952 A | * | 4/1991 | Clark et al. | 349/193 |
| 5,111,321 A | * | 5/1992 | Patel | 349/198 |
| 5,313,562 A | | 5/1994 | Wiltshire | |
| 5,361,320 A | * | 11/1994 | Liu et al. | 385/143 |
| 5,532,854 A | * | 7/1996 | Fergason | 349/200 |
| 5,859,728 A | | 1/1999 | Colin et al. | 359/561 |
| 6,154,591 A | * | 11/2000 | Kershaw | 385/39 |
| 6,222,599 B1 | * | 4/2001 | Yoshida et al. | 349/106 |
| 6,373,614 B1 | * | 4/2002 | Miller | 359/237 |
| 6,404,537 B1 | * | 6/2002 | Melman et al. | 349/323 |

OTHER PUBLICATIONS

Chiba, T. et al., "Polarization Stabilizer Using Liquid Crystal Rotatable Waveplates", Journal of Lightwave Technology, IEEE, vol. 17, No. 5, May 1999.

Andreas Weber, Brian L. Heffner, David W. Dolfi; "Reset–Free System for Real–Time Polarization Control and Synthesis"; Instruments and Photonics Laboratory HPL–92–30, Aug. 1992.

"HP 11896A and HP 8169A Polarization Controllers"; HP 1999 Light Wave Test and Measurement Catalogue, Jan. 1999, p. 80.

"Polarization Control with Liquid Crystals"; Meadowlark Optics Polarization Solutions, 1999–2000 Catalog, pp. 34–43.

Ohtera, Yasuo et al., "Rotating Waveplates Using Liquid Crystal", Proc. 21st Eur. Conf. On Opt. Comm (ECOC'95—Brussels), Sep. 17–21 1995, pp. 279–282 1995, pp. 279–282.

\* cited by examiner

*Primary Examiner*—Robert H. Kim
*Assistant Examiner*—David Chung

(57) ABSTRACT

A polarization control device, comprising: a liquid crystal device containing a liquid crystal material with an optical anisostropy with substantially homeotropically aligned molecules when in a neutral electrical field state; a plurality of electrodes for applying an electrical field to change an orientation of the molecules of the liquid crystal material from their alignment in the neutral electrical filed state; a circuit for applying a voltage to the electrodes; and an optical system for directing light through the liquid crystal material.

9 Claims, 6 Drawing Sheets

Electrical field direction ered vertically at the edge of the crystal material around its perimeter. Field lines connecting the electrodes will likely bulge, and are not guaranteed to be parallel to the boundary planes, but this configuration is satisfactory as long as a substantial field component exists that is parallel to the boundary plates.

POLARIZATION CONTROL DEVICE

BACKGROUND OF THE INVENTION

1. Field of the Invention

The present invention relates generally to devices for controlling light characteristics in an optical communication system, and more particularly, to devices that control the state of polarization of light in an optical communication system.

2. Description of the Related Art

Devices that control the state of polarization of light find application in fiber optical communication systems, as well as in optical test and measurement equipment. Most of the devices for controlling the polarization state of light are operated manually by turning an optical fiber or other optical element, or are operated by using the electrode-optic effect in solid state devices. These polarization control devices are typically able to convert any input state of polarization to any output state of polarization. However, mechanical polarization control devices have a slow response time on the order of 1000 ms, and have large dimensions (typically several 10 cm$^3$), and consume more than 100 mW of power to drive the motors that provide the necessary movement of optical elements.

Another method for controlling the state of polarization of light is to use a liquid crystal-based polarization controller. Such controllers allow the transformation from any input state of polarization to a limited range of output states of polarization. By way of example, one such polarization control device is made by Meadowlark Corporation, Frederick, Colo., and uses a series of liquid crystal wave plates at fixed orientations with variable retardance to form a polarization control device. The Meadowlark device uses a modulating electric field which is perpendicular to the boundary planes of the liquid crystal device.

A problem of Meadowlark-type devices is that they are not able to convert any input state polarization to any output state of polarization. Additionally, this type of device also has a relatively large power requirement as well as a large response time.

SUMMARY OF THE INVENTION

Briefly, the present invention comprises, in one embodiment, a polarization control device, comprising: a liquid crystal device containing a liquid crystal material with an optical anisotropy with substantially homeotropically aligned molecules when in a neutral electrical field state; a plurality of electrodes for applying an electrical field to change an orientation of the molecules of the liquid crystal material from their alignment in the neutral electrical field state; a circuit for applying a voltage to the electrodes; and an optical system for directing light through the liquid crystal material.

In a further aspect of the present invention, the liquid crystal device includes two parallel alignment plates with the liquid crystal material disposed therebetween; and wherein the electrodes comprise at least one electrode disposed adjacent one of the alignment plates on one side of the directed light, and at least another of the electrodes disposed adjacent the other of the alignment plates on an opposite side of the directed light, and energized to generate an electrical field substantially parallel to the alignment plates, but with an electrical field component perpendicular to the alignment plate.

In yet a further aspect of the present invention, a polarization detector is included that is disposed to receive light transmitted through the liquid crystal material and to generate a signal dependent on the polarization of the light received from the liquid crystal material; and a feedback circuit for receiving the polarization-dependent signal, generating a control signal, and providing that control signal to the circuit for applying a voltage to the electrodes, to control a voltage characteristic of the electrodes in accordance therewith.

In a further embodiment of the present invention, a method for polarization control is provided comprising the steps of: providing a liquid crystal device that contains a liquid crystal material with homeotropically aligned molecules when in a neutral state; causing an electrical field to be generated across the liquid crystal device; and directing light through the liquid crystal material.

DETAILED DESCRIPTION OF THE PREFERRED EMBODIMENT

The present invention is directed to a polarization control device based on a liquid crystal cell. The invention allows the transformation of substantially any input state of polarization to substantially any output state of polarization with a low power consumption in the control device. In a preferred embodiment, the power consumption may be less than 1 mW, with a response time in the range of 10 ms. Additionally, the size and price of the present inventive embodiment is significantly lower than for other solutions.

Figure 2A:
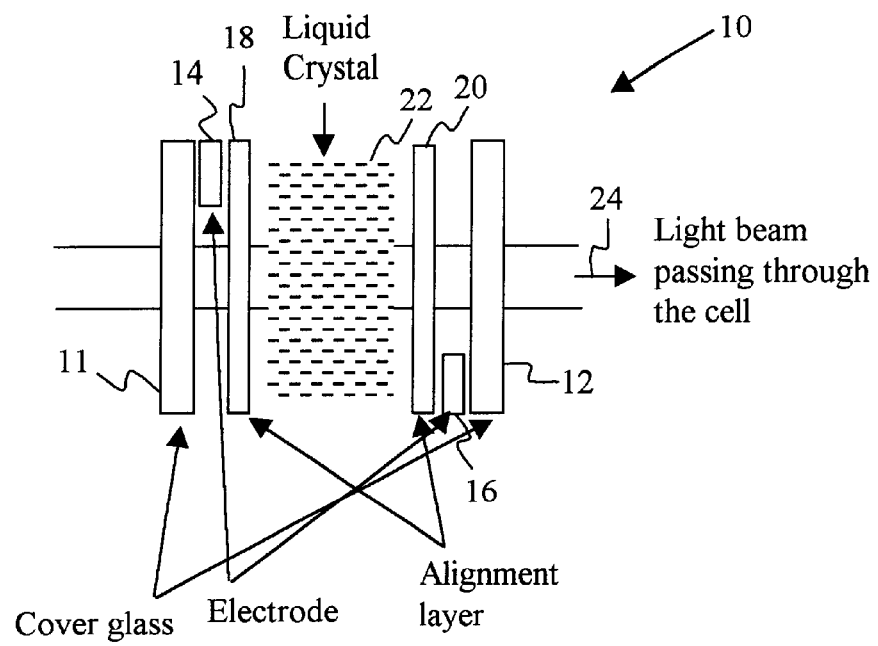
FIG. 2A is a schematic diagram of a liquid crystal cell in cross section in an "off" state.

One embodiment of a liquid crystal cell 10 which may be utilized to implement the present invention is shown in FIG. 2A. Referring to that figure, the embodiment disclosed includes cover glasses 11 and 12, electrodes 14 and 16 which are connected by lines and circuitry 17 to appropriate voltages, alignment layers 18 and 20, and liquid crystal material 22. The cover glasses 10 and 12 are preferably parallel to provide a uniform cell gap for the device. For a given gap, the electrical field applied controls the orientation of the anisotropy of the liquid crystal. The gap across the cover glasses 10 and 12 must typically be thick enough to provide a sufficient amount of phase shift. By way of example, the gap typically will be in the range of one to ten microns. However, the preferred thickness/gap is determined based on the optical anisotropy of the material 22 used for the liquid crystal. The liquid crystal material 22 is preferably uniaxially birefringent. The refractive index for the liquid crystal material 22 can be described as an ellipsoid. The liquid crystal material 22 may be implemented by a variety of materials including nematic phase liquid crystal materials and other materials with liquid crystal phases that allow for a similar alignment of the crystal orientation that is initially perpendicular to the cover glass boundaries. A typical example of such a liquid crystal material that provides a positive dielectric anisotropy is made by Merck, Whitehouse Station, N.J. and designated with product names Merck ZLI-4792 and MLC13300-000.

Preferably, the electrodes 14 and 16 are formed by coating selected areas on the glass covers 11 and 12 with an appropriate material which is electrically conducting. Note that the drawing does not illustrate the coatings, but rather shows the electrodes as separate elements for ease of explanation. The electrodes 14 and 16, which in the preferred embodiment are formed on the surfaces of the glass cover plates 11 and 12, apply an electrical field through the liquid crystal material 22 in a direction to be discussed below. The alignment layers 18 and 20 are used to induce the liquid crystal molecules therebetween to orient themselves in a particular direction. The alignment layers are chosen so that without an electric field being applied, the orientation of the long axis of the ellipsoid of the liquid crystal material 22 is perpendicular to the cover glass plates 11 and 12. The particular material used to implement the alignment layers 18 and 20 will depend on the particular liquid crystal material 22 being utilized. As noted, the alignment layers 18 and 20 preferentially force the liquid crystal molecules that come in contact with the surface thereof to orient in a particular direction. In the present invention, this particular direction is a homeotropic orientation, meaning that the long axis of the liquid crystal molecules are substantially perpendicular to the plane of the alignment layers 18 and 20. By way of example, but not by way of limitation, the material for these alignment layers 18 and 20 may be polyimide which is available from a variety of companies including DuPont, EM, and Nissan Chemical. Specific examples of such material are SE7511L and SE2511L from Nissan Chemical America Corporation, Houston, Tex. In a preferred embodiment, the alignment layers may be deposited over the cover glasses 11 and 12 and the electrodes 14 and 16. The initial homeotropic alignment which is desired for the present invention is accomplished by the interaction between the liquid crystal material 22 and the molecules of the polyimide alignment layers 18 and 20 deposited on the cover glass. Light is to be directed through the liquid crystal material 22 in the direction of the arrow 24.

Figure 1A:
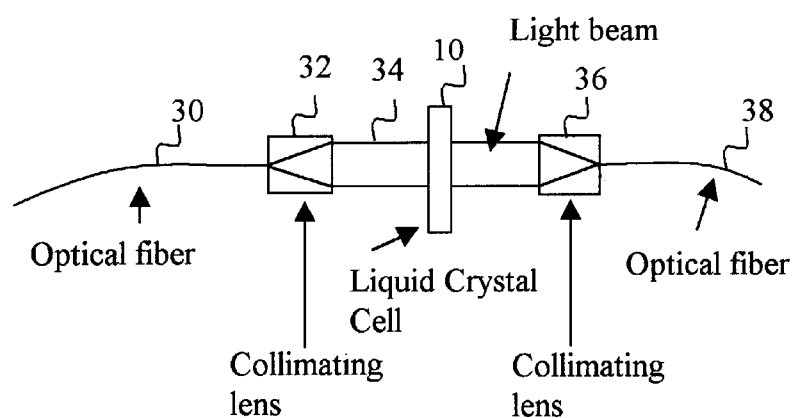
FIG. 1A is a schematic diagram illustrating one embodiment of the present invention.

Referring now to FIG. 1, there is shown a preferred embodiment of a polarization control device in accordance with the present invention. Incoming light 30 may be delivered to a lens system 32. The light may be delivered to the lens system through a variety of different delivery media. By way of example, but not by way of limitation the light may be delivered by means of an optical fiber 30. In the embodiment shown in FIG. 1A, the lens system 32 is shown to be a collimating lens 32, which operates to collimate the light received into a substantially parallel beam of light 34. The collimated light 34 is directed through the liquid crystal material 22 in the liquid crystal cell 10 and then focused by a focusing lens 36 back into an optical fiber 38. An electrical voltage supplied to the electrodes 14 and 16 in the liquid crystal cell 10 causes an electrical field (shown in FIG. 2B) to be directed through the liquid crystal material 22 to thereby induce an electrical dipole in the liquid crystal molecules to change the orientation of the liquid crystal material 22. In turn, this change in the orientation of the liquid crystal material changes the state of polarization of the light passing through the liquid crystal material 22. Preferably, a liquid crystal material 22 is utilized in the liquid crystal cell 10 that allows for fast changes in orientation of the liquid crystal material. It should be noted that even faster changes in orientation of the liquid crystal material can be achieved by heating the liquid crystal material. However, note that the temperature change required will depend on the liquid crystal material chosen, and the highest temperature must be below the nematic isotropic phase transition. The nematic phase is one of the liquid phases between liquid and solid and depends on the choice of material.

It should be noted that some types of alignment layers 18 and 20 require that a threshold voltage be applied to the electrodes 14 and 16 before the orientation of the liquid crystal material 22 begins to change. As a general rule, the greater the electrical field applied to the electrodes 14 and 16, the greater the change in orientation that is achieved. The term "neutral electrical field state" means the field necessary to achieve a homeotropic alignment of the liquid crystal molecules. In most cases, this neutral electrical field state is a 0 volt electrical field.

Figure 2B:
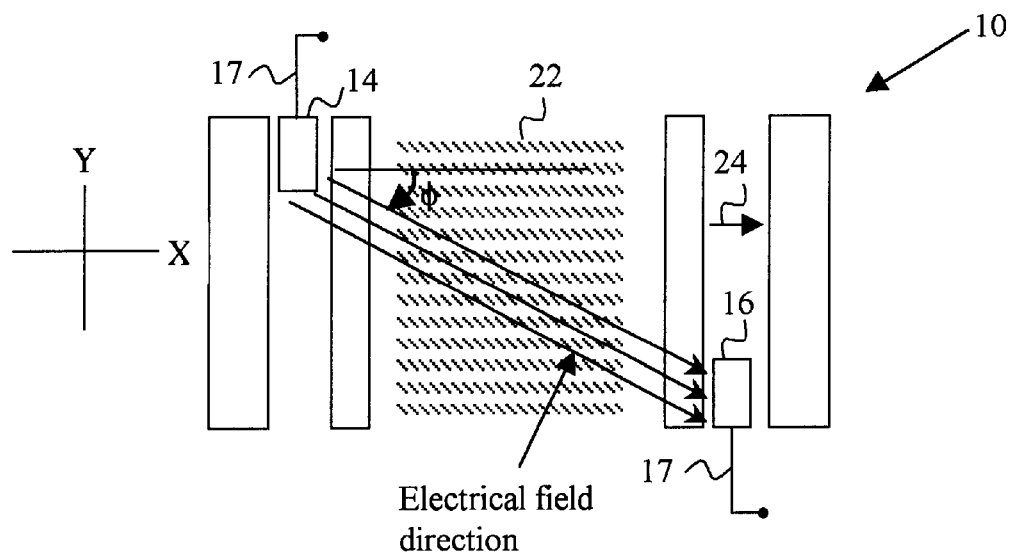
FIG. 2B is a schematic diagram of a liquid crystal cell in cross section in an "on" state.

Referring now to FIG. 2B, a schematic cross sectional diagram is shown of the liquid crystal cell 10 with a voltage applied to the electrodes 14 and 16 to thereby apply an electrical field to the liquid crystal material 22. The electrical field should have a small vector component parallel to the original orientation (the original orientation is substantially perpendicular to the planes of the cover glasses 11 and 12) of the refractive index ellipse of the liquid crystal molecules in order to define a sense of rotation for the liquid crystal molecules as the electrical field across the electrodes 14 and 16 is increased. Although the present invention is not limited to any particular type of voltage, and both direct current and alternating current voltages may be applied, it is preferred that an AC voltage or other symmetrical waveform voltage be utilized in order to prevent charges from migrating in the liquid crystal material 22. It should be noted that if the electrical field being applied does not have a small vector component parallel to the original orientation of the refractive index ellipse of the liquid crystal molecules, then when the AC voltage is applied, since there is no preferred direction of rotation for the liquid crystal molecules, domain boundaries may be set up in the material 22 that would cause adverse effects on the performance of the polarization control. In order to provide an electrical field component parallel to the original orientation of the refractive index ellipse of the liquid crystal molecules, an electrode structure is used that provides at least a pair of electrodes, with one electrode 14 in the pair of electrodes disposed on a surface of the cover glass 11, and the other electrode 16 in the pair of electrodes disposed on a surface of the cover glass 12, but at an opposite end of the cover glass 12 relative to the location of the electrode 14 on the cover glass 11, so that the electrodes 14 and 16 straddle and are on opposite sides of the beam of light 24 propagating through the liquid crystal material 22, as shown in FIG. 2A and FIG. 2B. This asymmetry provides a small component of the electrical field perpendicular to the plane of the alignment layers or plates 18 and 20. It should be noted that the angle φ between the direction of the electrical field generated by the electrodes 14 and 16 and the x axis, and which is shown in FIG. 2B, is significantly exaggerated for purposes of illustration. In most preferred configurations, the dimension of the liquid crystal cell 10 in the y direction is significantly longer than the dimension in the x direction between the cover glass plates 11 and 12, so that the component of the electrical field which is parallel to the original substantially horizontal (parallel to the x axis) orientation of the liquid crystal molecules refractive index ellipse is small relative to the electrical field component perpendicular to this original orientation.

It should be noted that the cell electrodes 14 and 16 are preferably be shaped in a way to avoid overlap with the path of the optical beam 24 through the liquid crystal cell 10. Properly shaped electrodes 14 and 16 will minimize optical loss and reflection. It should also be noted that the placement and shape of the electrodes 14 and 16 control the uniformity of the electrical field over a given area. Accordingly, a variety of different electrode pair placements and shapes may be utilized in order to achieve a desired level of uniformity of the electrical field. Moreover, multiple electrode pairs may be utilized to achieve desired levels of electrical field uniformity. By way of example, a desired electrical field uniformity may be 0.1% over a particular area of the liquid crystal material. The optical system 32 used to direct the light through the liquid crystal material 22 can be optimized to direct the light through substantially only the area of uniform electrical field.

In a preferred embodiment, an AC electrical field is applied to drive the liquid crystal cell 10 with a frequency high enough that the liquid crystal material responds only to the RMS value of the field. The preferred frequency range for the AC electric voltage is 1 kHz–10 kHz. However, the actual frequency for the AC voltage will depend on the LC material chosen.

Figure 3:
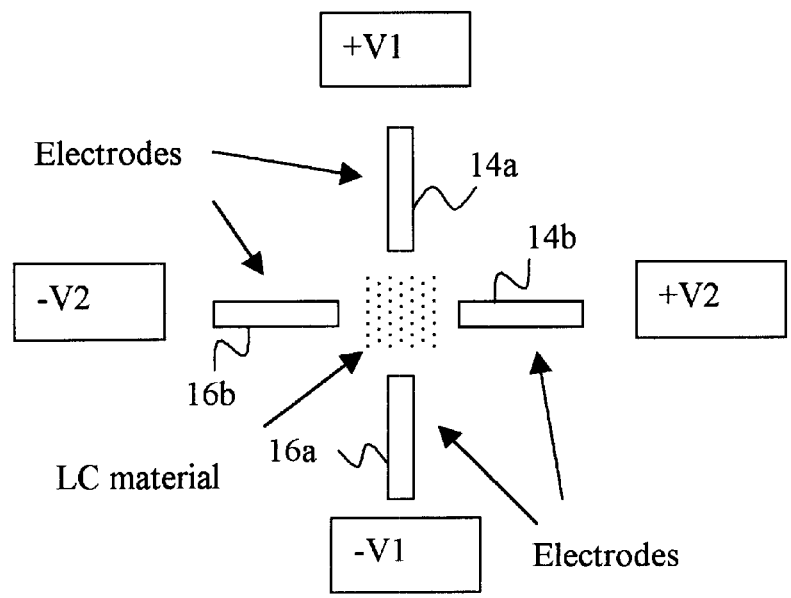
FIG. 3 is a schematic diagram illustrating an electrode structure that may be utilized to implement the present invention.

Referring now to FIG. 3, one configuration of the electrodes 14 and 16 is shown. In this figure, the voltages V1 and V2 are applied to spoke-shaped electrodes 14a and 14b, respectively, which are disposed at right angles on the cover glass 11. Likewise, voltages −V1 and −V2 are applied to the spoke-shaped electrodes 16a and 16b, respectively, which are disposed at right angles on the cover glass 12, and make up the other end of the pairings for the electrodes 14a and 14b, respectively. This configuration of electrodes results in an electrical field that is tilted with respect to the initial refractive index ellipse of the liquid crystal molecules. The direction of the liquid crystal molecules is changed by the field. Since the liquid crystal material 22 responds to the RMS value of the electrical field in the preferred embodiment, the ratio of the voltage amplitude V2/V1 determines the azimuthal orientation of the liquid crystal molecules, whereas the absolute voltage values determine the tilt from the original perpendicular orientation of the liquid crystal molecules. The tilt angle together with the birefringence of the liquid crystal molecules and the cell gap for the liquid crystal cell 10 determine the phase shift that is imposed on the optical beam 34 passing through the cell.

As noted above, the number of electrode pairs may be increased beyond the number shown to increase the uniformity of the electrical field at the location where the light beam 24 will pass through the liquid crystal device. Only two electrode pairs, 14a–16a and 14b–16b, are shown in FIG. 3 for convenience of illustration.

It can be shown that an optical birefringent element in accordance with the present invention that can assume azimuthal orientations of, for example, 0 to 180°, and provide a phase shift also between 0 and 180°, thereby converting any input state of polarization to any output state of polarization.

Figure 1B:
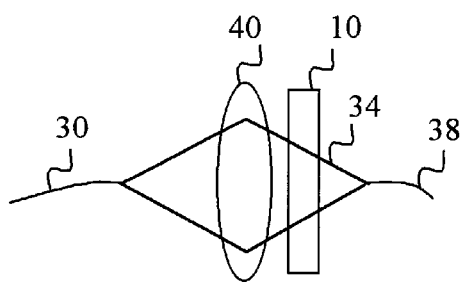
FIG. 1B is a diagram showing a different configuration of a lens in relation to a liquid crystal device.
Figure 1C:
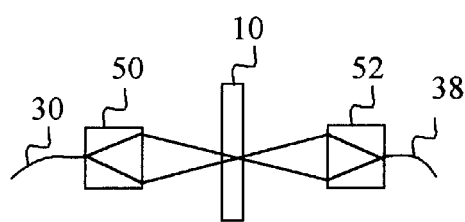
FIG. 1C is a schematic diagram showing a liquid crystal device with lenses to a focus of the light onto an area on the liquid crystal device.

Other possible embodiments for the lens system used with the liquid crystal polarization control device are shown in FIG. 1B and FIG. 1C. The lens systems control the shaping of the light beam as it is directed through the liquid crystal material 22 in order to be compatible with the area of electrical field uniformity. In FIG. 1B only a single lens 40 is used, instead of two lenses, to focus light emitted from a fiber 30 into the second fiber 38, with the liquid crystal cell 10 located in the light path 34 between the lens 40 and the fiber 38, but closer to the fiber 38 than to the lens 40. It can be seen that the area of the light beam directed by a lens 40 onto the liquid crystal cell 10 may be controlled to be less than the area for the collimated beam of light shown in FIG. 1A, depending on the placement of the liquid crystal cell.

Referring now to FIG. 1C, a lens configuration is used with the liquid crystal cell 10 in order to focus the beam of light onto a very small area on the liquid crystal cell 10. In this configuration, the light is focused by a focusing lens 50 onto a very small area on the liquid crystal cell 10, and the light passing through the liquid crystal cell 10 is received by a lens 52 and focused onto the optical fiber 38. The configurations set forth in FIG. 1B and FIG. 1C are advantageous in that they allow for smaller liquid crystal cell dimensions and/or less complicated electrode configurations because a uniform electrical field must be achieved over a smaller area.

Figure 4:
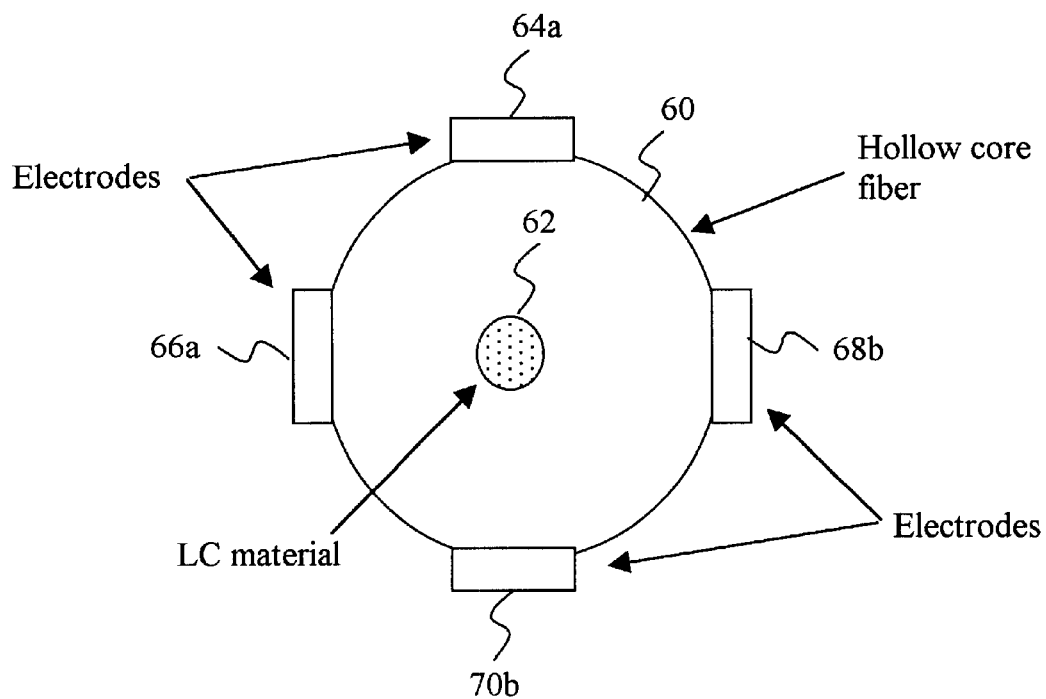
FIG. 4 is a schematic diagram showing a polarization control system in a section of hollow core optical fiber filled with liquid crystal material.
Figure 5A:
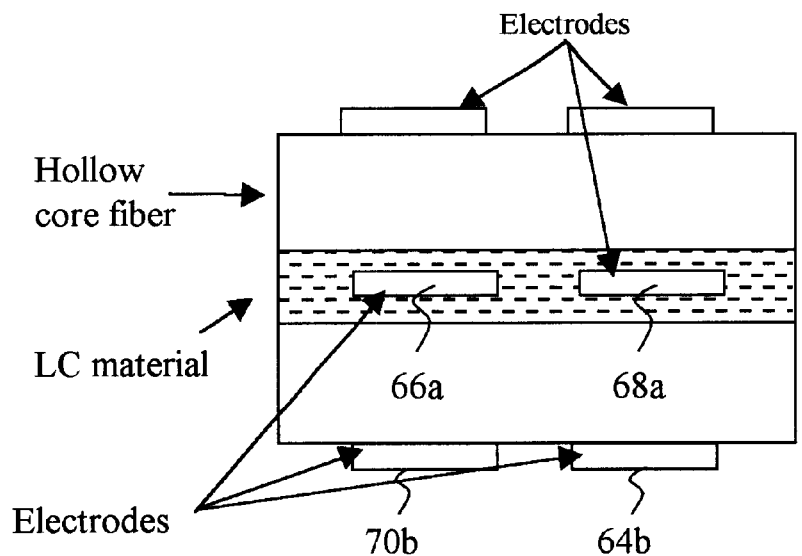
FIG. 5A is a side view schematic diagram of an optical fiber system with the electrical field in an "off" state.
Figure 5B:
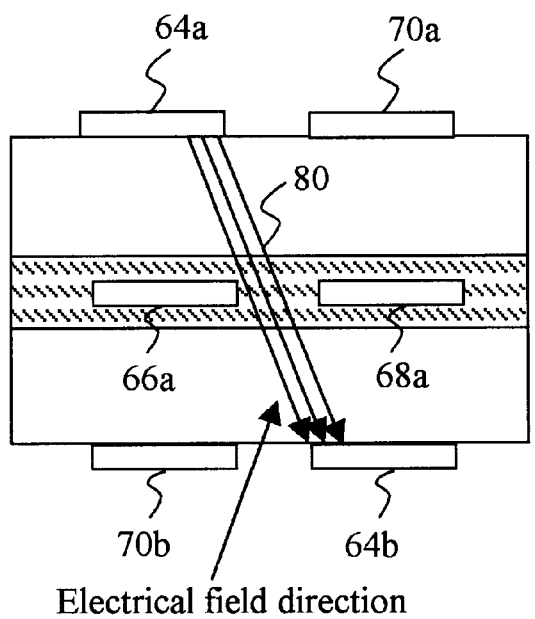
FIG. 5B is a schematic diagram side view of an optical fiber system with the electrical field in an "on" state.
Figure 5C:
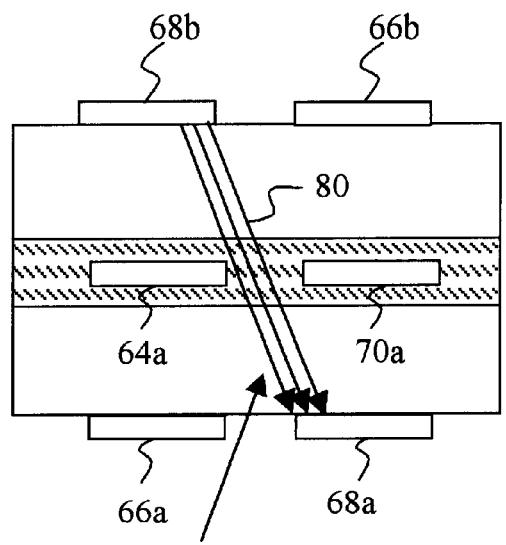
FIG. 5C is a schematic diagram showing a different view of the optical fiber embodiment shown in FIGS. 5A and 5B.

FIG. 4 illustrates an alternative embodiment for the present invention. In this embodiment, polarization control is accomplished using a section of hollow-core optical fiber 60, filled with liquid crystal material 62, and including a plurality of electrodes disposed to provide an electrical field. FIGS. 5A, 5B and 5C illustrate the use of four electrode pairs. A first electrode pair 64a–64b provides an electrical field in a first direction 80, which is illustrated with the field lines between the electrodes 64a and 64b in FIG. 5B. A field perpendicular to that shown may be applied between electrodes 68a and electrode 68b, as shown in FIG. 5C. Optionally, a second set of electrodes 70a and 70b may be provided to generate an electrical field in a different direction relative to the direction 80. Additionally, an electrode pair 66a and 66b may be provided in order to generate an electrical field with a direction different from the electrical field provided by the electrode pair 68a–68b.

The long axis of the refractive index ellipse of the liquid crystal material 62 is initially aligned parallel to the direction of the fiber 60. A voltage is applied to the electrodes in a way to provide an electric field with a substantial vector component perpendicular to the direction of the fiber, and a small vector component parallel to the direction of the fiber for the reasons discussed previously. The operation of this fiber-based polarization control device is analogous to the previously described operation. The advantages of this optical fiber polarization control configuration are reduced size and fewer components in the system.

Figure 6:
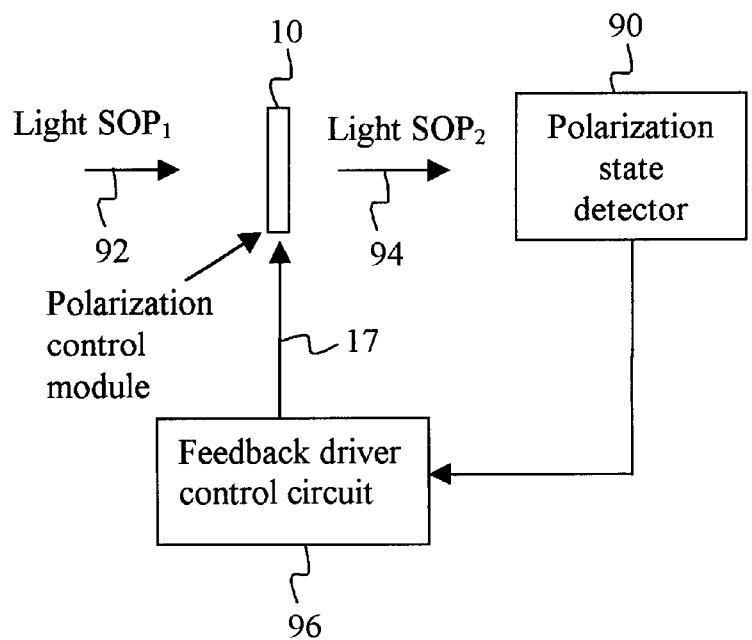
FIG. 6 is a schematic diagram illustrating a polarization control system with feedback.

Referring now to FIG. 6, there is shown a polarization control system with feedback. All of the elements in the system are not shown, for ease of illustration. The elements shown in the figure include a liquid crystal cell 10, a polarization state detector 90, and a feedback driver control circuit 96. In operation, light 92 with a first state of polarization enters the polarization control module that includes the liquid crystal cell 10 with the appropriate electrical drivers to provide the necessary electric field across electrodes on the liquid crystal cell 10, as previously described. The polarization control system changes the polarization state of the light 92 to a second state of polarization 94. This light 94 is detected by a polarization state detector 90 which provides an electrical feedback signal indicative of this detected polarization to the feedback driver control circuit 96 for use in generating a control signal to control the voltages across the electrodes to thereby set the liquid crystal cell 10 to the second state of polarization. The polarization state detector 90 can be implemented in a variety of different configurations. By way of example, the polarization state detector 90 can include a beam splitter that transmits most of the light, but uses a fraction of the light for polarization state detection. One type of polarization state detector is made by Hewlett Packard Company, Palo Alto, Calif. This polarization state detector 90, in one embodiment, would generate at least three electrical signals (proportional to the Stokes parameters to thereby define a vector) that characterize the second state of polarization. The electrical signals proportional to the Stokes parameters for the second state of polarization are applied to the feedback driver control circuit 96 where they are compared to electrical signals proportional to the Stokes parameters for a vector representing a desired state of polarization. The difference generated by this comparison is used to control the ratio and the magnitudes of the voltages applied to the various electrode pairs in the liquid crystal cell 10 to achieve the desired polarization state.

Accordingly, various embodiments of a system and a method for allowing the transformation of any input state of polarization to any output state of polarization have been provided. These embodiments allow for a power consumption which is significantly reduced from prior art devices and with a response time in the range of on the order of 10 ms.

Figure 7:
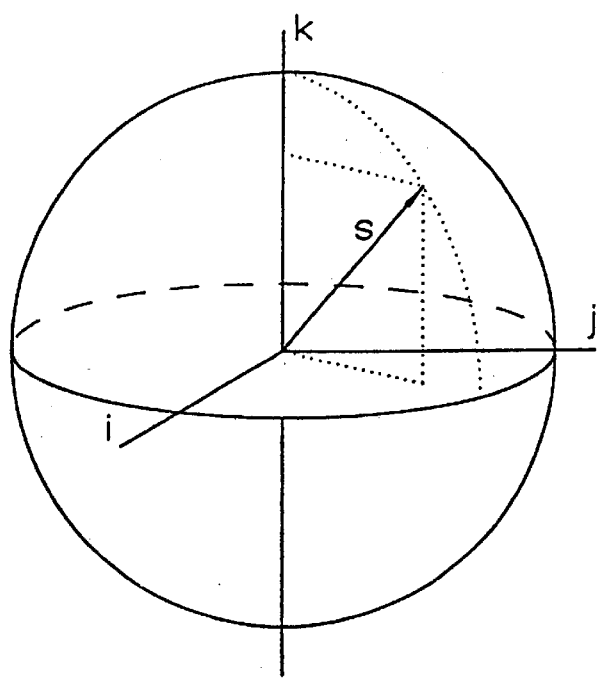
FIG. 7 is a schematic diagram of a Poincarè sphere.

One possible algorithm for a solution to transform between any two arbitrary polarization states by using a single orientable waveplate of variable phase shift is set forth below. A state of complete polarization can be specified by a point on the surface of a Poincarè sphere as shown in FIG. 7. The vector $\vec{s}$ has components $(s_i, s_j, s_k)$ in the Poincarè space that are related to the amplitude and phase of the polarization vector $\vec{a} = (a_x, a_y e^{i\delta})$ in physical space (z being the direction of propagation of the light). The relevant relations are:

$$s_i = a_x^2 - a_y^2$$
$$s_j = 2 a_x a_y \cos \delta$$
$$s_k = 2 a_x a_y \sin \delta$$

Both $\vec{a}$ and $\vec{s}$ are normalized vectors, and $a_x$ and $a_y$ are positive numbers. The relative phase of the x and y components of the polarization are determined by the phase $\delta$, and the overall phase of $\vec{a}$ is not material to the representation of the state of polarization of the system.

A birefringent plate having its slow axis in the (x, y) plane oriented at an angle $\theta$ with respect to the taxis and inducing a relative phase shift of $\Phi$ between light polarized parallel to and perpendicular to the slow axis transforms states of polarization on the Poincarè sphere by a rotation of $\Phi$ about an axis in the (i, j) plane oriented at an angle of $2\theta$ with respect to the i axis. This is a particularly simple example of a transformation of the polarization states on the Poincarè sphere.

It is shown that, given two states of polarization, one can always find a single birefringent plate transformation that takes one state into the other. Note that any two points on a latitude of a sphere can be transformed into one another by a rotation about the pole to which that latitude is referenced. That latitude is defined by the intersection with the surface of the sphere of a plane perpendicular to the pole. The problem becomes finding a "pole" (i.e., a radial vector) that lies in the (i, j) plane and has a plane perpendicular to it that contains the two points on the Poincarè sphere representing the two states that are to be connected. The direction of that radius then defines the orientation of the slow axis of the birefringment plate required for the appropriate transformation, and the longitudinal angular separation of the two points (referenced to the "pole" defined by that radius) defines the required retardation of the plate.

Two polarization states represented by two points on the Poincarè sphere are, $\vec{s_1} = (s1_i, s1_j, s1_k)$ and $\vec{s_2} = (s2_i, s2_j, s2_k)$. The vector $\Delta \vec{s} = \vec{s_2} - \vec{s_1}$ is parallel to all planes that contain the points $(s1_i, s1_j, s1_k)$ and $(s2_i, s2_j, s2_k)$. The vector corresponding to the desired pole is $\vec{p} = (p_i, p_j, p_k)$. The requirement that $\vec{p}$ be in the (i, j) plane means that $p_k = 0$. If $\vec{p}$ is to be orthogonal to a plane containing the points defined by $\vec{s_1}$ and $\vec{s_2}$, it must also be orthogonal to $\Delta \vec{s}$. This orthogonality conditions $\vec{p} \cdot \Delta \vec{s} = 0 = p_i(s2_i - s1_i) + p_{j(s2j}-s1_j)$ can be solved to yield:

$$\frac{p_j}{p_i} = -\frac{(s_{2i} - s_{1i})}{(s_{2j} - s_{1j})} = \tan 2\theta$$

where $\theta$ is the angle of the slow axis of the required birefringent plate with respect to the x axis. Note that the vectors $\vec{p}$ and $-\vec{p}$ satisfy the orthogonality condition, so there is a potential ambiguity. One of the choices will lead to a retardation angle $0 < \Phi < \pi$, but at this point it cannot be determined which choice that will be. Therefore, the ambiguity is temporarily resolved by requiring $p_j > 0$. If the required retardation angle is $> \pi$, then the choice of pole direction is reversed. In addition, $\vec{p}$ is required to be normalized.

Figure 8:
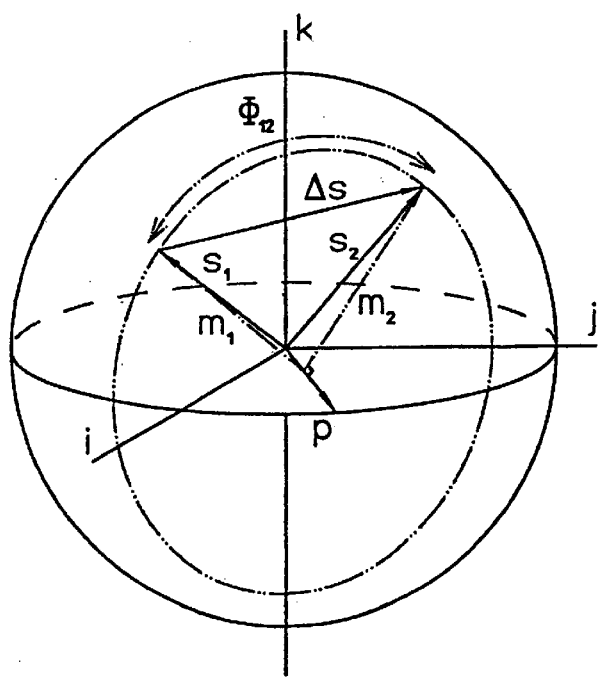
FIG. 8 is a diagram of an algorithm schematic.

In order to find the required retardation, the angle is determined between a vector $\vec{m_1} \perp \vec{p}$ that passes through $(s1_i, s1_j, s1_k)$ and $\vec{m_2} \perp \vec{p}$ passing through $(s2_i, s2_j, s2_k)$. It is clear by inspection of FIG. 8 that the appropriate vectors are $$\vec{m_\alpha} = \vec{s_\alpha} - (\vec{s_\alpha} \cdot \vec{p}) \vec{p}, \text{ where } \alpha = 1, 2.$$

Now, $\vec{m_1} \cdot \vec{m_2} = m_1 m_2 \cos \Phi_{12}$, where $\Phi$ is the desired angle. Therefore, $$\Phi_{12} = \arccos\left[\frac{\vec{m_1} \cdot \vec{m_2}}{m_1 m_2}\right]$$

and the phase shift of the waveplate required to transform $\vec{s_1}$ to $\vec{s_2}$ is now known.

At this point, it must be determined if the original choice of orientation was appropriate. To do this consider $(\vec{s_2} \times \vec{s_1}) \cdot \vec{p}$. If this quantity is $>0$, then the correct choice has been made; if it is <0, then the rotation direction must be chosen to be $-\vec{p}$. This change of orientation in Poincarè space corresponds to orienting the slow axis of the waveplate at an angle of θ+π/2.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A polarization control device, comprising:
   a liquid crystal device containing a liquid crystal material with an optical anisotropy with substantially homeotropically aligned molecules when in a neutral electrical field state;
   a plurality of electrodes for applying an electrical field to change an orientation of the molecules of said liquid crystal material from their alignment in the neutral electrical field state, wherein said electrodes comprise at least two pairs of electrodes disposed on said hollow-core optical fiber, where one of the two pairs of electrodes is disposed on the hollow-core optical fiber so as to provide a first electric field and the other of the two pairs of electrodes is disposed on the hollow-core optical fiber so as to provide a second electric field perpendicular to the first electric field;
   a circuit for applying a voltage to said electrodes; and
   an optical system for directing light through said liquid crystal material, wherein said liquid crystal device comprises a hollow-core optical fiber; and wherein said liquid crystal material is disposed within a hollow interior of said hollow core optical fiber.

2. A device as defined in claim 1, wherein said optical system comprises:
   an optical fiber; and
   a lens for directing light from said optical fiber to said liquid crystal material.

3. A device as defined in claim 1, wherein said lens is designed to collimate light from said optical fiber and direct that collimated light onto said liquid crystal material.

4. A device as defined in claim 1, wherein said lens is designed to focus light from said optical fiber onto said liquid crystal material.

5. A device as defined in claim 1, wherein said lens is designed to focus said light to a predetermined area on said liquid crystal device.

6. A device as defined in claim 1, further comprising:
   a polarization detector disposed to receive light transmitted through said liquid crystal material and generating a vector signal dependent on polarization of the light received from said liquid crystal material; and
   a feedback circuit for receiving said vector signal, generating a control signal, and providing said control signal to said circuit for applying a voltage to said electrodes, to control a voltage characteristic of said electrodes in accordance therewith.

7. A device as defined in claim 1, wherein said electrodes comprise at least two pairs of electrodes; and wherein said feedback circuit controls a ratio of the voltages applied across said pairs of electrodes.

8. A device as defined in claim 1, wherein said lens does not collimate said light or focus said light on said liquid crystal material.

9. A device as defined in claim 1, further comprising a heater disposed to heat said liquid crystal material.

* * * * *